(12) United States Patent
Williams et al.

(10) Patent No.: US 6,963,027 B1
(45) Date of Patent: Nov. 8, 2005

(54) FOLDABLE SURFACE MOUNT OUTLET BOX

(75) Inventors: James W. Williams, 50 Robbins Rd., Branchburg, NJ (US) 08876; John K. Domici, Jr., Flemington, NJ (US); Boris Orshansky, Phillipsburg, NJ (US)

(73) Assignee: James W. Williams, Branchburg, NJ (US)

( * ) Notice: Subject to any disclaimer, the term of this patent is extended or adjusted under 35 U.S.C. 154(b) by 0 days.

(21) Appl. No.: 10/938,349

(22) Filed: Sep. 10, 2004

(51) Int. Cl.[7] .............................................. H02G 3/08
(52) U.S. Cl. ..................... 174/50; 174/17 R; 174/53; 174/58; 229/198.2
(58) Field of Search .................... 174/50, 53, 17 R, 174/54, 58, 60; 220/3.6, 3.8, 4.02; 229/198.2

(56) References Cited

U.S. PATENT DOCUMENTS 2,552,400 A * 5/1951 Brunia ...................... 220/3.94
6,142,365 A * 11/2000 Breitbach ................. 229/198.2

* cited by examiner

Primary Examiner—Dhiru R. Patel
(74) Attorney, Agent, or Firm—Joanne M. Billmers; Robert L. Billmers

(57) ABSTRACT

This invention relates to a surface mount outlet box for use in electrical, electronic, security and various telecommunications installations which stores and ships flat to save space and interfaces with a wide variety of face plates and raceways.

17 Claims, 6 Drawing Sheets

FOLDABLE SURFACE MOUNT OUTLET BOX

BACKGROUND OF THE INVENTION

Standard surface mounted electrical boxes used in residential and commercial installations are commonly made of rigid, molded plastic or metal construction. Shipment, storage, and job site transport of these boxes is often inefficient and inconvenient, and require the installer to have a variety of sizes on hand. There is generally across the industry a need for a less cumbersome type of outlet box to make use and transport from commercial supplier to individual contractor or homeowner easier.

SUMMARY OF THE INVENTION

The subject of this invention is a foldable surface mounted outlet box commonly used in electrical, electronic, security, telecommunications and related fields for housing a junction of raceways or electrical wiring on the surface of a wall. The surface mounted outlet box described herein differs from those presently available in several ways. First, this outlet box is constructed as a flat sheet of U.L. rated plastic which is folded into a three dimensional box when ready to use. This allows the outlet boxes to be more efficiently (and less expensively) shipped, stored and carried at the job site. In addition, the outlet boxes can easily be locked together for gang use at the time of installation. This eliminates the need to order and store a variety of outlet box sizes. The outlet box can also accepts all standard face plates and interfaces with a variety of raceway sizes, providing convenient use in a broad range of electrical wiring applications.

DETAILED DESCRIPTION OF THE INVENTION

For the purposes of this invention, an outlet box is a lidless rectangular box having four sides and a bottom which serves as an intersecting point for electrical wires or raceways, or to house switches, connectors, sensors or like. A surface mounted outlet box is defined as an outlet box which is installed to a wall such that the box is secured to the wall surface, making it visible and accessible from the front of the wall. Electrical wires are defined as any insulated wire used to carry electrical, electronic, security, telecommunications or computer signals in residential or commercial buildings. A raceway is defined as a hollow conduit used for conducting, protecting and hiding electrical wires along the surface of interior walls.

Commonly available types of surface mount outlet boxes are single boxes, measuring approximately 60 mm×100 mm, double boxes, measuring approximately 100 mm×100 mm and gang boxes, which are defined for the purposes of this invention as a combination of multiple outlet boxes created by connecting them side-by-side. Gang boxes are constructed in order to accommodate large numbers of electrical wires. The type of outlet box used depends upon the number and size of incoming and outgoing electrical wires or raceways and varies with each construction project.

The sides of a surface mount outlet box commonly contain two or more screw receptacles for the attachment of a face plate or electrical accessory. A screw receptacle is defined for the purposes of this invention as a perpendicularly oriented attachment to the side of an outlet box with an opening through which a screw can be inserted in order to secure a face plate or electrical accessory to the open face of an outlet box. Some examples of electrical accessory are, but not limited to, switches, phone jacks, computer connectors, sensors such as light, sound or fire, security control and the like. A face plate is defined as a plastic lid which attaches to the open face of an outlet box which conceals the contents of the box from view. Face plates afford protection from contact with exposed electrical wiring and can be decorative in nature. Additionally, face plates may contain, but not limited to, electrical outlets, switches or jacks used for the connection of electrical devices, including, computer equipment.

This invention consists of a single sheet of rigid molded material which lies flat when fabricated. The rigid molded material includes, but is not limited to, U.L. rated plastic, polystyrene, rigid PVC, polypropylene, polyethylene, Delrin®, and ABS plastic. The sheet thickness may range from 0.1–15 mm. In an embodiment of this invention the sheet thickness will be between 1 and 5 mm.

Figure 1:
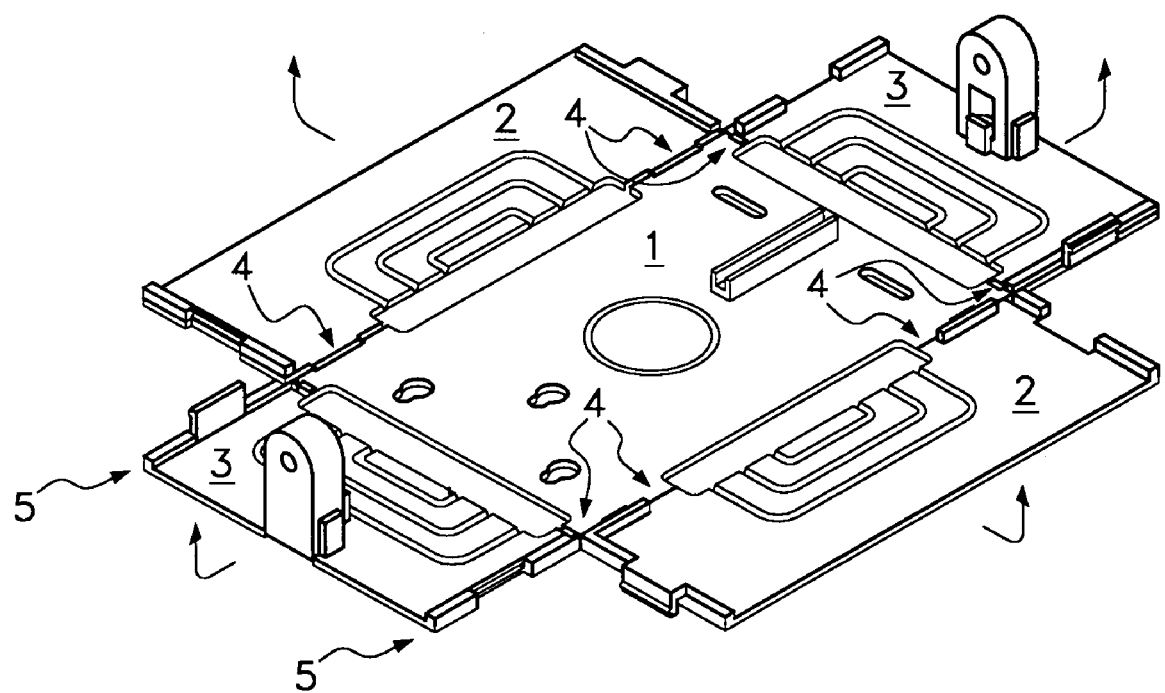
FIG. 1 depicts the article as manufactured flat for packing, storage and transport to the job site, with clips as a means for attaching side panels.
Figure 2:
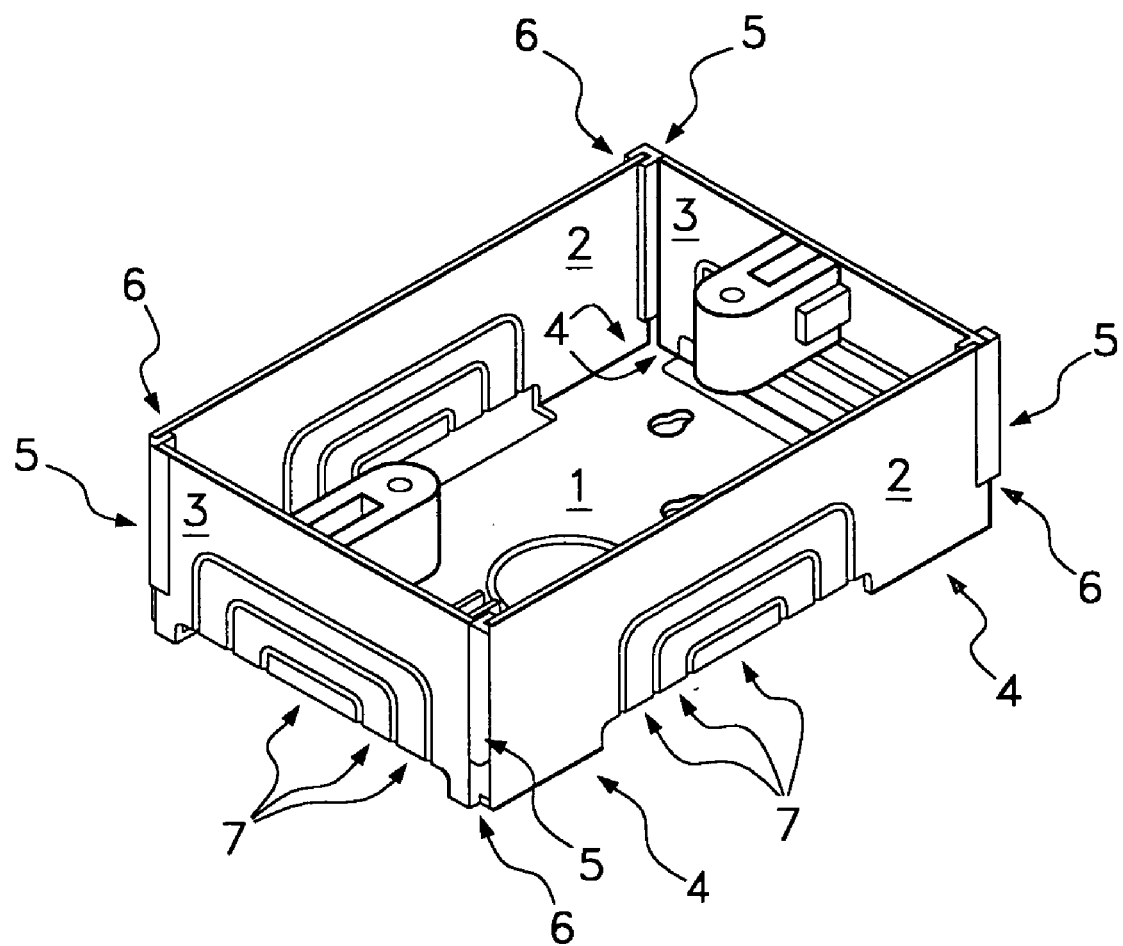
FIG. 2 depicts the article ready for use after locking into a three dimensional box.

As shown in FIG. 1, the sheet is manufactured as a center rectangular section (1) measuring from 40 to 200 mm on a first side by 60 to 400 mm on a second side surrounded by and connected to a pair of first side panels and a pair of second side panels (2 & 3) which, when the pair of first side panels and the pair of second side panels are folded up along their respective connecting edges (4), form the bottom and sides of a three dimensional box measuring from 40 to 400 mm×40 to 200 mm×30 to 150 mm in size (FIG. 2). For the purposes of this invention, all pairs of side panels will be opposing (i.e. located opposite or directly across from each other with parallel connecting edges (4)).

Alternatively stated, the pair of first side panels contains a first side panel and a second side panel located on opposite ends of the bottom such that their respective connecting edges (4) are parallel to each other. Likewise, the pair of second side panels contains a third side panel and a fourth side panel located on opposite ends of the bottom such that their respective connecting edges (4) are parallel to each other. The third and fourth side panels are positioned perpendicular to the first and second side panels. Additionally, the third and fourth side panels are shorter than or equal in length to the first and second side panels.

In one embodiment the pair of first and pair of second side panels will be of different lengths when the center section is rectangular, in which case the longer side panels (2) are defined as the first pair. The shorter side panels (3) are designated as the second pair. In another embodiment of the invention the center section (1) is square, measuring from 40 to 400 mm on each side and having the pair of first and pair of second side panels of equal length.

The pair of second side panels (3) contains a means for attaching them to the pair of first side panels to form a three dimensional box. Typical means for attachment include, but are not limited to, clips, channels, tongue-and-groove connectors, pins, staples and clamps.

In one embodiment of the invention the means for attaching is a channel mechanism shown in FIG. 2, in which the pair of second side panels contains a set of dual molded ridges (5) which forms a channel at each of their two edges perpendicular to the connecting edge (4) and protruding 1 to 5 mm above the thickness of the side panels. The channel serves to receive the perpendicular edges (6) of the pair of first (2) side panels. This locks the pair of first side panels into place, creating a strong, durable, secure three dimensional box.

Figure 5:
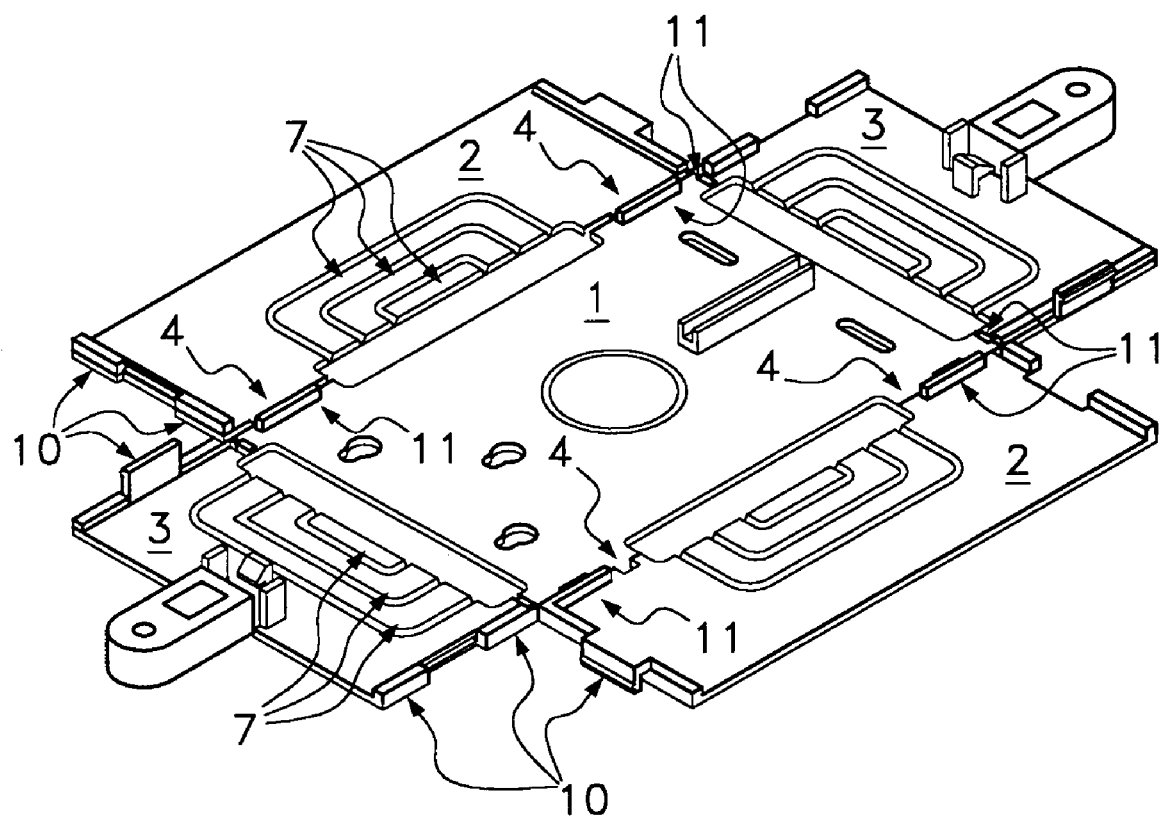
FIG. 5 depicts the article as manufactured flat for packing, storage and transport to the job site, with molded tongue-and groove means for attaching side panels.

In another embodiment of the invention, shown in FIG. 5, the means for attaching the pair of first (2) side panels and pair of second (3) side panels is a set of molded interlocking tongue-and-groove shapes (10). In this embodiment, the pair of first (2) side panels and pair of second (3) side panels snap fit together to create a three dimensional box.

Another embodiment of this invention shown in FIG. 5 are stops (11), protrusions along the connecting edges of the center section and the pairs of first and second side panels which prevent over-bending of the sides with respect to the bottom during folding.

The pair of first side panels (2) and the pair of second side panels (3) contain various sizes of knockout perforations (7) which fit a range of electrical conduits and raceways. A knockout perforation is defined for the purposes of this invention as a previously perforated, folded or otherwise weakened portion of a box designed for removal in order to create an opening for the insertion of electrical conduits or raceways. Knockout perforations may vary in shape and size from rectangular to square to circular or oval and from 5–80 mm in width.

Figure 4:
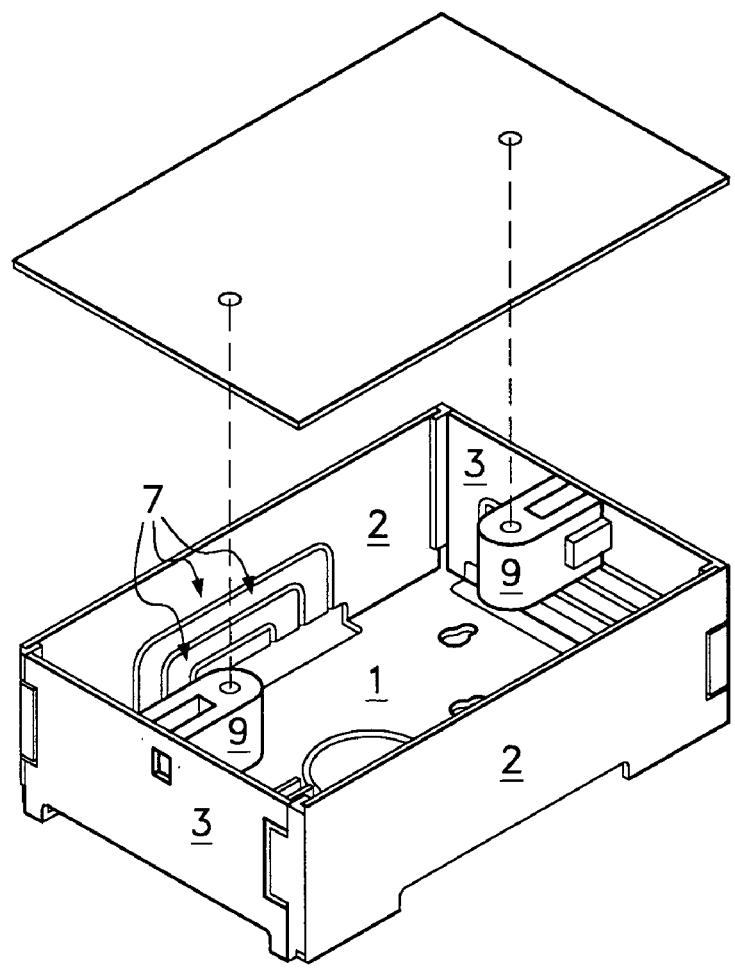
FIG. 4 depicts final attachment of face plate.
Figure 4:
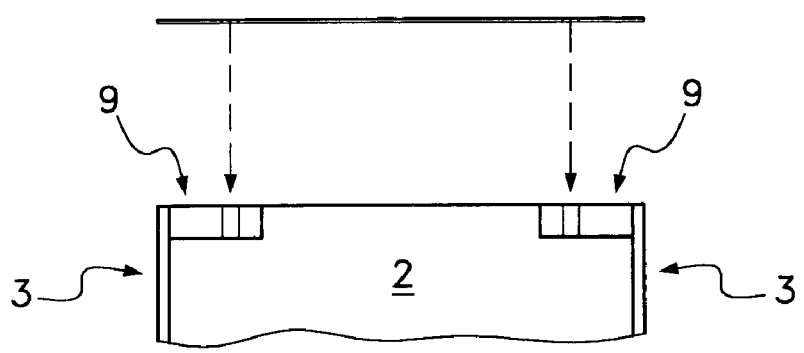

Another requirement of the invention, shown in FIG. 4, is a pair of screw receptacles (9) for attaching a faceplate or electrical accessory to the outlet box located on the pair of second side panels. In one embodiment, the screw receptacles are formed on a bendable hinge and can be locked into position before attachment of the faceplate. In another embodiment the screw receptacle is molded in place. The attachment of a faceplate or an electrical accessory to said screw receptacles will lock the surface mounted outlet box into its three dimensional shape, and prevent access to the box without first removal of the faceplate or electrical accessory.

One skilled in the art would recognize that virtually any type of wiring or raceway application that commonly uses a surface mount outlet box can be used with the invention described herein. In an embodiment of the invention the outlet box is made out of ABS plastic.

Figure 3:
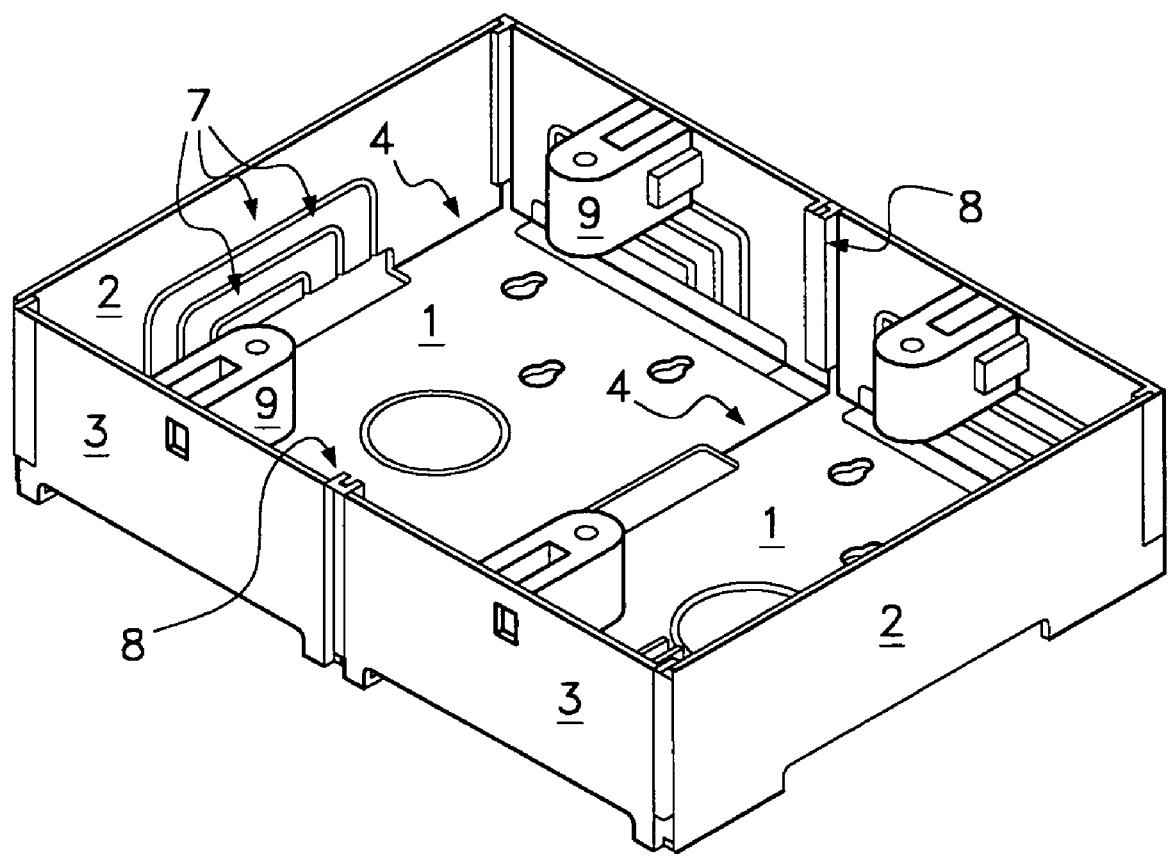
FIG. 3 depicts combination of multiple units for gang use with clips as a means for connecting sides of boxes to one another.
Figure 6:
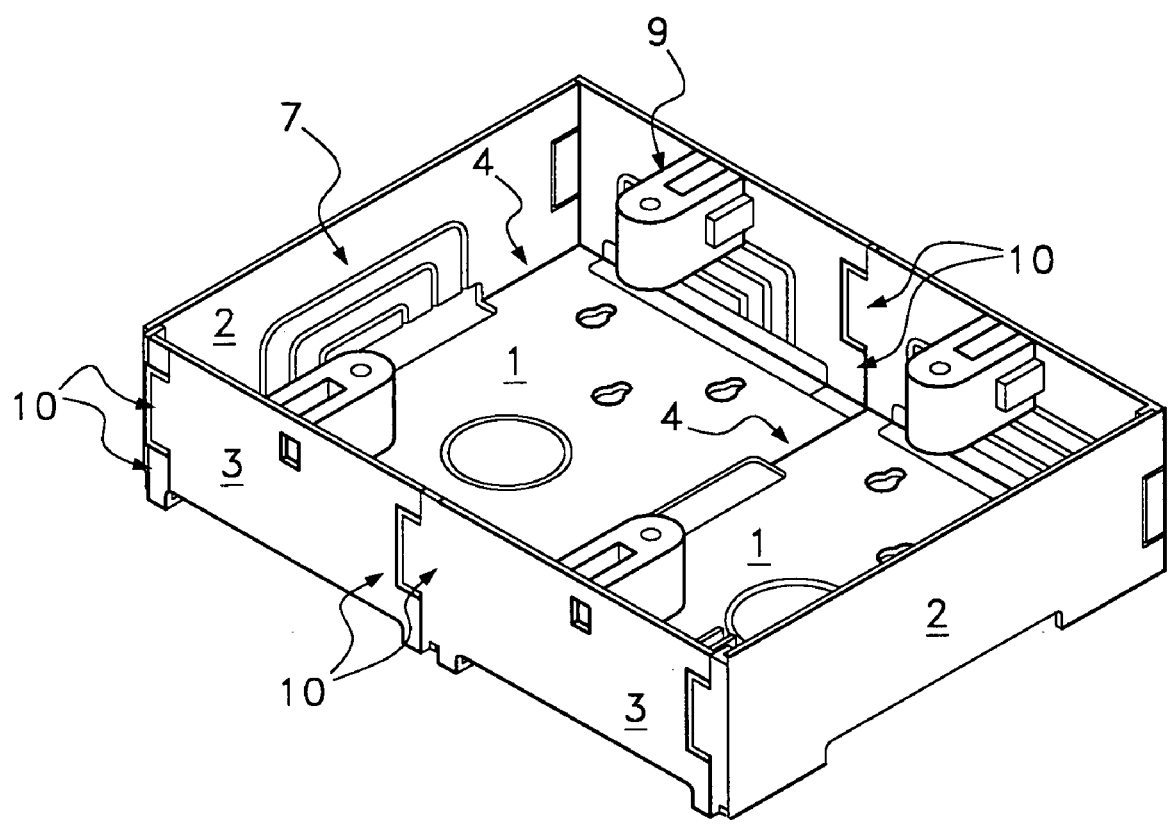
FIG. 6 depicts combination of multiple units for gang use with tongue and groove means for connecting sides of boxes to one another.

Another feature of the surface mounted outlet boxes of the invention is the ability to fit two or more boxes together (gang) to form bigger sized outlet boxes. This is accomplished by removing one or more of the first side panels and connecting the pair of second side panels of the first box with the pair of second side panels of the second or subsequent outlet box such that the bottoms of the first and second box are aligned in a plane (FIGS. 3 and 6).

Means for connecting the pair of second sides of the first and second boxes include: tongue-and-groove shapes, interlocking shapes, clips, staples, clamps and the like. In one embodiment, shown in FIG. 6, the connecting means is a set of molded interlocking tongue-and-groove shapes (10). In another embodiment, shown in FIG. 3, the connecting means is a clip (8).

EXAMPLES

The foldable surface mount outlet box can be used for the installation of computer cables in a residential or commercial building. The cables would be conducted through an appropriately sized raceway along a wall or surbase and end at an outlet box. The outlet box could be installed in order to accept the cables and connect them to an outlet jack to provide a user with an outlet into which a personal workstation could be plugged. One skilled in the art would recognize that this example is non-limiting and that use of this device across a large number of trades is possible.

What is claimed:

1. An outlet box comprising a flat sheet of rigid molded material able to be folded to form a three dimensional box with a bottom and a pair of first and a pair of second opposing side panels, a means for attaching said pair of first and said pair of second side panels, a screw receptacle located on each one of the pair of second side panels, and molded stops to prevent over-bending located on said bottom, said pair of first and said pair of second side panels.

2. The outlet box of claim 1 wherein the rigid molded material is plastic.

3. The outlet box of claim 2 wherein the rigid molded material is chosen from the group consisting of polystyrene, rigid PVC, polypropylene, polyethylene, Delrin® and ABS plastic.

4. The outlet box of claim 2 wherein the rigid molded material is between 1 and 5 mm in thickness.

5. The outlet box of claim 2 wherein the pair of first and the pair of second side panels contain knockout perforations.

6. The outlet box of claim 5 wherein the means for attaching said pairs of first and second side panels has dual molded ridge and channel interlocking shapes.

7. The outlet box of claim 5 wherein the means for attaching said pairs of first and second side panels has tongue-and-groove interlocking shapes.

8. The outlet box of claim 1 wherein said pair of first side panels is longer than said pair of second side panels, creating a bottom which is rectangular in shape and measures 60 to 400 mm on said first side by 40 to 200 mm on said second side.

9. The outlet box of claim 1 wherein said pairs of first and second side panels are equal in length, creating a bottom which is square in shape and measures 40 to 400 mm on each side.

10. The outlet box of claim 1 wherein a faceplate or an electrical accessory is secured to the screw receptacles such that the outlet box is locked into shape.

11. A ganged outlet box comprising two or more outlet boxes of claim 1 in which one or more of the first side panels is removed from a first and a second or a subsequent outlet box and said first and second or subsequent outlet boxes are connected together by a means for connecting the pair of second side panels from the first outlet box to the pair of second side panels of the second and subsequent outlet boxes such that the bottoms of said first and second and subsequent outlet boxes are aligned in a plane.

12. The ganged outlet box of claim 11 wherein the means for connecting is a clip.

13. The ganged outlet box of claim 11 wherein the rigid molded material is plastic.

14. The ganged outlet box of claim 13 wherein the means for connecting is a set of interlocking tongue-and-groove shapes.

15. The ganged outlet box of claim 14 wherein the pairs of first and second side panels contain knockout perforations.

16. The ganged outlet box of claim 14 wherein the means for attaching said pairs of side panels has dual molded ridge and channel interlocking shapes.

17. The ganged outlet box of claim 14 wherein the means for attaching said pairs of side panels has tongue-and-groove interlocking shapes.

* * * * *